(12) United States Patent
Kuramoto et al.

(10) Patent No.: US 7,849,474 B2
(45) Date of Patent: Dec. 7, 2010

(54) MOTOR HAVING CHUCKING DEVICE AND DISK DRIVING APPARATUS INCLUDING THE SAME

(75) Inventors: Satoru Kuramoto, Kyoto (JP); Hitoshi Takaki, Kyoto (JP); Tomoya Uchimura, Kyoto (JP); Yusuke Iwai, Kyoto (JP); Yoko Fukumoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 553 days.

(21) Appl. No.: 12/015,758

(22) Filed: Jan. 17, 2008

(65) Prior Publication Data

US 2008/0178204 A1    Jul. 24, 2008

(30) Foreign Application Priority Data

Jan. 18, 2007    (JP)    ............................... 2007-008677

(51) Int. Cl.
*G11B 17/028* (2006.01)
(52) U.S. Cl. ..................................................... 720/707
(58) Field of Classification Search ................. 720/707, 720/702, 623, 614, 709, 713, 712, 605, 715, 720/632, 604, 675; 310/90.5, 89
See application file for complete search history.

(56) References Cited

U.S. PATENT DOCUMENTS

| | | | |
|---|---|---|---|
| 7,493,633 B2 | 2/2009 | Ikemoto | |
| 7,538,459 B2 * | 5/2009 | Ichizaki | ..................... 310/67 R |
| 2005/0246729 A1 * | 11/2005 | Omori et al. | ................. 720/675 |
| 2008/0179978 A1 * | 7/2008 | Ichizaki | ........................ 310/89 |
| 2009/0096303 A1 * | 4/2009 | Takaki et al. | ............... 310/90.5 |

FOREIGN PATENT DOCUMENTS

| | | |
|---|---|---|
| JP | 11-306627 A | 11/1999 |
| JP | 2006-48821 A | 2/2006 |
| KR | 1020050095085 A | 9/2005 |

OTHER PUBLICATIONS

Korean Office Action dated May 27, 2009, issued in corresponding Korean Patent Application No. 10-2008-005416.

\* cited by examiner

*Primary Examiner*—Allen T Cao
(74) *Attorney, Agent, or Firm*—Westerman, Hattori, Daniels & Adrian, LLP

(57) ABSTRACT

A motor includes a chucking device for detachably holding a disk-shaped storage medium. The chucking device includes a plurality of radially outwardly biased claw members. Further, the claw members make contact with a top surface of a cover portion of a turntable when the claw members are in contact with the top edge of a central opening of the storage medium. At least one of the claw member's contact sections and the turntable's contact section is made of a material different than a material forming the remaining sections of the claw members and the remaining section of the turntable so that the static friction coefficient between the claw member's contact sections and the turntable's contact section becomes greater than the static friction coefficient between the claw members and the rest portions.

14 Claims, 16 Drawing Sheets

MOTOR HAVING CHUCKING DEVICE AND DISK DRIVING APPARATUS INCLUDING THE SAME

FIELD OF THE INVENTION

The present invention relates to a motor provided with a chucking device for attaching and detaching a disk-shaped storage medium (hereinafter, simply referred to as a "disk"), the motor being of a structure in which the disk is not readily removed while being held in place by means of the chucking device.

BACKGROUND OF THE INVENTION

In recent years, a chucking device is employed in a spindle motor for rotating a disk mounted on a disk driving apparatus about a specified center axis. The chucking device is usually of a type in which the disk is held in place by a plurality of claw members provided in the chucking device. In the chucking device of this type, it is required to use a structure in which the disk is readily attachable but is hardly removed.

A conventional chucking device will be described with reference to FIG. 15. FIG. 15 shows an axially-cut schematic section view of the conventional chucking device wherein a disk KD mounted thereon.

Referring to FIG. 15, the chucking device 1 includes a centering case 2 having a ceiling plate portion 2a and a cylinder portion 2b, a plurality of claw members 3 received in the centering case 2, and a plurality of resilient members 4 for biasing the plurality of claw members 3. A turntable 5 for supporting the disk is arranged on an axial lower side of the chucking device 1 (see, e.g., Japanese Patent Laid-open Publication No. H11-306627).

Since the claw members 3 make contact with the upper edge of a central opening KD1 of the disk KD, the tip end portions of the claw members 3 is in an axially upwardly inclined state. In this state, the radially inward bottom portions of the claw members 3 are brought into contact with the upper surface of the turntable 5. Upon detaching the disk KD, the claw members 3 are caused to move radially inwardly.

The force required in detaching the disk KD (hereinafter referred to as a "detaching force") is decided by the reaction force acting against the radial inward compression of the resilient members 4 during radial inward movement of the claw members 3 and the frictional force generated by contact between the claw members 3 and the turntable 5. In this connection, if the detaching force is increased by making greater the reaction force acting against the radial inward compression of the resilient members 4, the force required in attaching the disk KD (hereinafter referred to as an "attaching force") is also increased resultantly, thereby failing to comply with the requirements of the disk driving apparatus. In the meantime, no effort has been made to develop a structure for increasing the frictional force generated by contact between the claw members 3 and the turntable 5, i.e. the detaching force of a disk is increasing without increasing the attaching force thereof.

SUMMARY OF THE INVENTION

The present invention provides a motor with a chucking device capable of increasing the detaching force of a disk without increasing the attaching force thereof and also a disk driving apparatus equipped with the motor.

In accordance with one aspect of the present invention, there is provided a motor including: a chucking device for detachably holding a disk having a central opening; a rotating member including a rotor magnet rotatable about a specified center axis and a turntable having a mounting portion for mounting the disk; and a fixed member for supporting the rotating member, the fixed member having a stator disposed in a facing relationship with the rotor magnet, the stator adapted to produce a rotating magnetic field in cooperation with the rotor magnet.

Herein, the turntable has a cover portion for covering an axial upper side of the stator and the chucking device is arranged on an axial top surface of the cover portion.

Further, the chucking device includes: a plurality of radially outwardly biased claw members having radial outermost tip sections; a centering case having reception holes for allowing the claw members to move radially and rest portions provided in the respective reception holes, the rest portions making sliding contact with the respective claw members when the tip sections of the claw members are moved axially downwardly, the reception holes being disposed radially inwardly of the central opening of the disk when the disk is mounted on the mounting portion; and resilient members received within the centering case for radially outwardly biasing the respective claw members by making contact therewith.

Herein, the tip sections of the claw members move axially downwardly and radially inwardly when the central opening of the disk is fitted around the centering case and the claw members make contact with a top edge of the central opening of the disk when the disk is mounted on the mounting portion.

Further, the claw members make contact with a top surface of the cover portion of the turntable when the claw members are in contact with the top edge of the central opening of the disk.

The claw members are provided with contact sections for making contact with the top surface of the cover portion of the turntable and the turntable is provided with a contact section for making contact with the claw members, and at least one of the claw member's contact sections and the turntable's contact section has surface roughness greater than the surface roughness of the rest portions and the portions of the claw members making contact with the rest portions.

With such configuration, it is possible to increase the force required in moving the claw members radially inwardly when detaching the disk (the detaching force), by ensuring that the surface roughness of the claw member's contact sections and the turntable's contact section becomes greater than the surface roughness of the rest portions and the portions of the claw members making contact with the rest portions. This makes it possible to provide a motor with increased reliability capable of eliminating the possibility that the disk is inadvertently removed from the chucking device by external impacts or vibration during rotation of the disk.

It is preferable that the claw member side contact sections are subjected to a texturing process.

With such configuration, it is possible to increase the surface roughness of the claw member's contact sections with ease by subjecting the claw member's contact sections to the texturing process.

In accordance with second aspect of the present invention, there is provided a motor including: a chucking device for detachably holding a disk having a central opening; a rotating member including a rotor magnet rotatable about a specified center axis and a turntable having a mounting portion for mounting the disk; and a fixed member for supporting the rotating member, the fixed member having a stator disposed in a facing relationship with the rotor magnet, the stator adapted to produce a rotating magnetic field in cooperation with the rotor magnet.

Herein, the turntable has a cover portion for covering an axial upper side of the stator and the chucking device is arranged on an axial top surface of the cover portion.

Further, the chucking device includes: a plurality of radially outwardly biased claw members having radial outermost tip sections; a centering case having reception holes for allowing the claw members to move radially and rest portions provided in the respective reception holes, the rest portions making sliding contact with the respective claw members when the tip sections of the claw members are moved axially downwardly, the reception holes being disposed radially inwardly of the central opening of the disk when the disk is mounted on the mounting portion; and resilient members received within the centering case for radially outwardly biasing the respective claw members by making contact therewith.

Herein, the tip sections of the claw members move axially downwardly and radially inwardly when the central opening of the disk is fitted around the centering case and the claw members make contact with a top edge of the central opening of the disk when the disk is mounted on the mounting portion.

Further, the claw members make contact with a top surface of the cover portion of the turntable when the claw members are in contact with the top edge of the central opening of the disk.

The claw members are provided with contact sections for making contact with the top surface of the cover portion of the turntable and the turntable is provided with a contact section for making contact with the claw members, and at least one of the claw member's contact sections and the turntable's contact section is made of a material different than a material forming the remaining sections of the claw members and the remaining section of the turntable so that the static friction coefficient between the claw member's contact sections and the turntable's contact section becomes greater than the static friction coefficient between the claw members and the rest portions.

With such configuration, it is possible to increase the force required in moving the claw members radially inwardly when detaching the disk (the detaching force), by ensuring that the claw member's contact sections and the turntable's contact section are made of a material having an increased static friction coefficient. This makes it possible to provide a motor with increased reliability capable of eliminating the possibility that the disk is inadvertently removed from the chucking device by external impacts or vibration during rotation of the disk.

It is preferable that the turntable's contact section is formed by fixing a rubber material, a silicon material or a material containing the rubber material and the silicon material to the top surface of the cover portion of the turntable.

Further, the rubber material, the silicon material or the material containing the rubber material and the silicon material is formed into an annular sheet shape.

With such configurations, it is possible to provide a motor in a cost-effective manner by using the rubber material and the silicon material which are widely available in commerce. Furthermore, the need to fix separate pieces in the positions corresponding to the respective claw members can eliminated by fixing a single annular sheet made of the rubber material, the silicon material or the material containing the rubber material and the silicon material to the top surface of the cover portion. This helps reduce the number of parts required, thereby making it possible to provide a motor at a low price.

It is preferable that the rubber material, the silicon material or the material containing the rubber material and the silicon material is extended to a position located radially inwardly of the claw member's contact sections when the claw members are moved radially inwardly to the greatest degree.

With such configuration, it is possible to obtain an increased frictional force whenever the claw members are moved radially inwardly. This makes it possible to increase the force required in moving the claw members radially inwardly when detaching the disk (the detaching force). As a result, it becomes possible to provide a motor with increased reliability capable of eliminating the possibility that the disk is inadvertently removed from the chucking device by external impacts or vibration during rotation of the disk.

It is preferable that the rubber material, a rubber material, a silicon material or a material containing the rubber material and the silicon material is fixed to each of the contact sections of the claw members.

Alternatively, the claw members are molded by coinjection molding and the claw member's contact sections are molded with a rubber material, a silicon material or a mixture of the rubber material and the silicon material.

Further, at least one of the rest portions and the portions of the claw members making sliding contact with the rest portions is formed to have surface roughness smaller than the surface roughness of the remaining portions of the centering case and the remaining portions of the claw members.

With such configuration, it is possible to reduce the force required in attaching the disk by ensuring that the rest portions and the portions of the claw members corresponding to the rest portions have surface roughness smaller than that of the remaining portions thereof. This makes it possible to provide a motor in which the disk is easily attachable but hardly removed.

In accordance with third aspect of the present invention, there is provided a motor including: a chucking device for detachably holding a disk having a central opening; a rotating member including a rotor magnet rotatable about a specified center axis and a turntable having a mounting portion for mounting the disk; and a fixed member for supporting the rotating member, the fixed member having a stator disposed in a facing relationship with the rotor magnet, the stator adapted to produce a rotating magnetic field in cooperation with the rotor magnet.

Herein, the turntable has a cover portion for covering an axial upper side of the stator and the chucking device is arranged on an axial top surface of the cover portion.

Further, the chucking device includes: a plurality of radially outwardly biased claw members having radial outermost tip sections; a centering case having reception holes for allowing the claw members to move radially and rest portions provided in the respective reception holes, the rest portions making sliding contact with the respective claw members when the tip sections of the claw members are moved axially downwardly, the reception holes being disposed radially inwardly of the central opening of the disk when the disk is mounted on the mounting portion; and resilient members received within the centering case for radially outwardly biasing the respective claw members by making contact therewith.

The tip sections of the claw members move axially downwardly and radially inwardly when the central opening of the disk is fitted around the centering case and the claw members make contact with a top edge of the central opening of the disk when the disk is mounted on the mounting portion.

Moreover, the claw members make contact with a top surface of the cover portion of the turntable when the claw members are in contact with the top edge of the central opening of the disk.

Herein, the claw members are provided with contact sections for making contact with the top surface of the cover portion of the turntable, and the friction coefficient between the claw member's contact sections and the cover portion is set greater than the friction coefficient between the claw members and the rest portions.

With such configuration, it is possible to increase the force required in moving the claw members radially inwardly when detaching the disk (the detaching force), by ensuring that the friction coefficient between the claw member's contact sections and the turntable's contact section is greater than the friction coefficient between the claw members and the rest portions. This makes it possible to provide a motor with increased reliability capable of eliminating the possibility that the disk is inadvertently removed from the chucking device by external impacts or vibration during rotation of the disk.

In accordance with a fourth aspect of the present invention, there is provided a disk driving apparatus including: the motor described above; an optical pickup performing at least one of recording information on and reproducing information from the disk in an optical manner; and a moving section for moving the optical pickup device in a radial direction of the disk.

In this configuration, the disk driving apparatus is equipped with the motor of the present invention. This makes it possible to provide a disk driving apparatus with increased reliability capable of eliminating the possibility that the disk is inadvertently removed from the chucking device by external impacts or vibration during rotation of the disk.

In accordance with the present invention, it is possible to provide a motor with a chucking device capable of increasing the detaching force of a disk without increasing the attaching force thereof and also to provide a disk driving apparatus equipped with the motor.

DETAILED DESCRIPTION OF THE PREFERRED EMBODIMENTS

<Overall Structure of a Brushless Motor>

Figure 1:
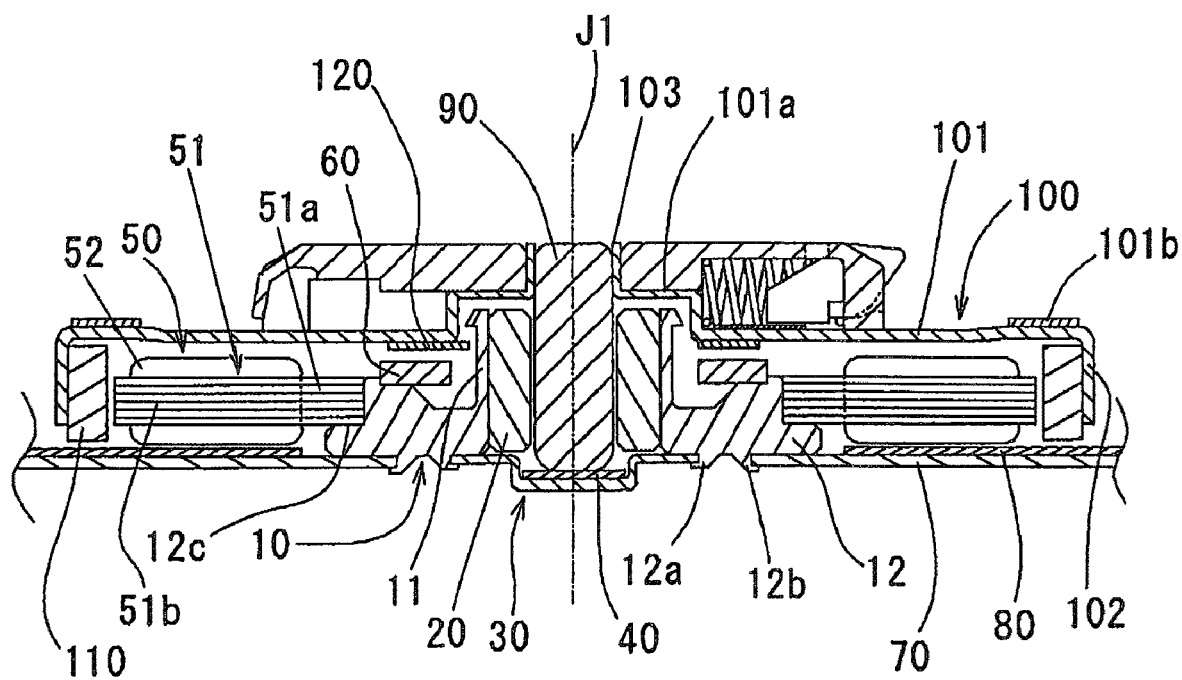
FIG. 1 is an axially-cut schematic section view showing one embodiment of a motor in accordance with the present invention.

One embodiment of a brushless motor in accordance with the present invention will now be described with reference to FIG. 1 showing an axially-cut schematic section view of the brushless motor.

First, description will be made with regard to fixed parts.

A housing 10 is manufactured by forming a copper-based material into a generally cylindrical shape through cutting and/or plastic working to have a center coinciding with a rotational axis J1. A sleeve 20 is fixedly secured to the inner circumferential surface of a cylinder portion 11 of the housing 10. The sleeve 20 is a sintered material impregnated with oil and is formed into a generally cylindrical shape.

A generally cylindrical fixed base portion 12 is integrally formed with the cylinder portion 11 at the axial lower end of the cylinder portion 11 of the housing 10 and extends radially outwardly from the cylinder portion 11. A radial inner protrusion and a radial outer protrusion (hereinafter referred to as an "inner protrusion 12a" and an "outer protrusion 12b", respectively) are formed on the bottom surface of the fixed base portion 12. A plate 30 is fixed by caulking in such a manner that the plate 30 can make contact with an inner portion of the bottom surface of the fixed base portion 12 and the inner peripheral surface of the inner protrusion 12a while covering the cylinder portion 11 and the sleeve 20. A discoid thrust plate 40 made of a resin material exhibiting increased wear resistance and slidability is disposed on an upper surface of the plate 30.

A stator mounting portion 12c for mounting a stator 50 is formed in an outer circumferential portion of the fixed base portion 12 of the housing 10. The stator 50 includes a stator core 51 having a generally ring-shaped core-back portion 51a and a plurality of teeth portions 51b extending radially outwardly from the core-back portion 51a, and a coil 52 formed of an electrically conductive line wound in plural layers around the teeth portions 51b of the stator core 51.

An annular preload magnet 60 is fixed to the fixed base portion 12 of the housing 10 on the radial inward side of the stator 50. The upper surface of the preload magnet 60 is in an axially facing relationship with the lower surface of a cover portion 101 of a rotor holder 100 which will be described later.

A mounting plate 70 is fixed by caulking in such a way that the mounting plate 70 makes contact with an outer portion of the bottom surface of the fixed base portion 12 and an outer peripheral surface of the outer protrusion 12b of the housing 10. A circuit board 80 for controlling rotation of the brushless motor is fixed to an upper surface of the mounting plate 70. The mounting plate 70 and the circuit board 80 are shaped to cover the stator 50 on an axial lower side of the latter.

Next, description will be made in respect of rotating parts.

A shaft 90 is disposed in a coaxial relationship with the rotational axis J1 so that it can be inserted into and through an inner circumferential surface of the sleeve 20. The shaft 90 is rotatably supported radially by the inner circumferential surface of the sleeve 20 and also rotatably supported axially by the upper surface of the thrust plate 40.

A generally cylindrical rotor holder 100 which covers the stator 50 is fixed to an upper portion of the shaft 90. The rotor holder 100 is formed through press-forming a thin magnetic steel plate. The rotor holder 100 is provided with a cover portion 101 and a cylinder portion 102. The rotor holder 100 is further provided with a generally cylindrical shaft fixing portion 103 having an inner circumferential surface fixed to an outer circumferential surface of the shaft 90. The cover portion 101 has a central protrusion portion 101a protruding upwardly in a position axially corresponding to the sleeve 20 and the cylinder portion 11 of the housing 10. Accordingly, the sleeve 20 can be lengthened in the axial direction by the vertical distance between the central protrusion portion 101a and the cover portion 101. A come-off preventing member 120 for preventing come-off of the rotor holder 100 is fixed to a lower surface of the cover portion 101 joined to the central protrusion portion 101a.

A rotor magnet 110 is fixed to an inner circumferential surface of the cylinder portion 102 of the rotor holder 100. The rotor magnet 110 has an inner circumferential surface facing the outer circumferential surfaces of the teeth portions 51b of the stator 50 with a small gap left therebetween.

A centering case 210 of a chucking device 200 (see FIG. 2) capable of detachably holding a disk-shaped storage medium KD which can store information therein (hereinafter, simply referred to as a "disk") (see FIGS. 6 to 10) having a central opening KD1 is fixed to an upper surface of the cover portion 101 of the rotor holder 100. An annular mounting portion 101b for mounting the disk KD thereon is formed in an outer edge portion of the cover portion 101. In the present embodiment, the rotor holder 100 serves as a turntable.

<Chucking Device>

Figure 2:
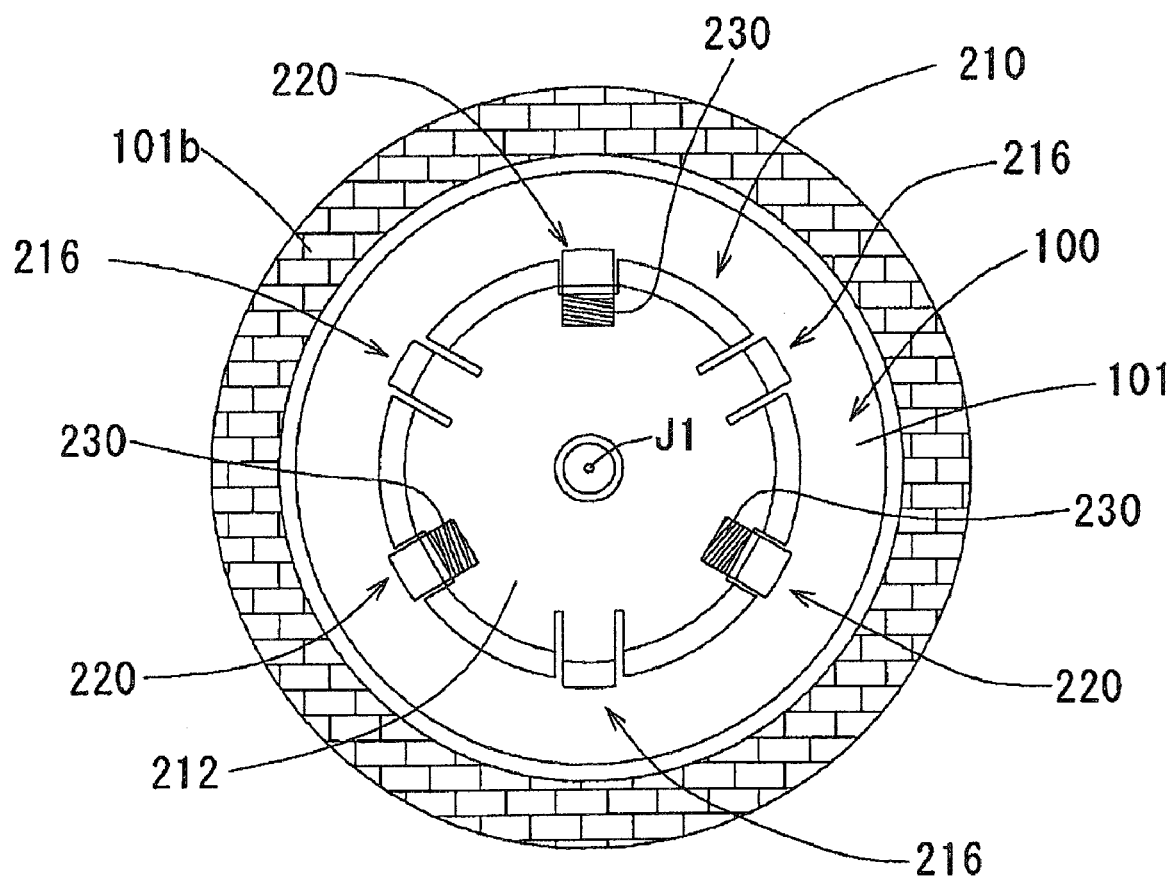
FIG. 2 is a top plan view illustrating one embodiment of a chucking device in accordance with the present invention.
Figure 3A:
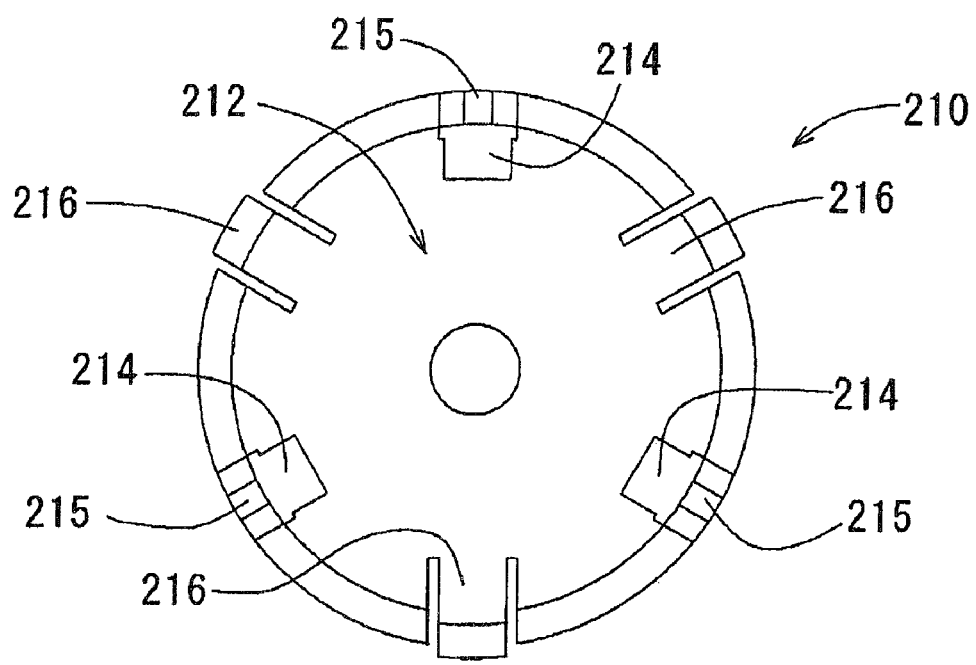
FIG. 3A is a top plan view showing a centering case employed in the chucking device of the present invention and FIG. 3B is an axially-cut schematic section view of the centering case.
Figure 3B:
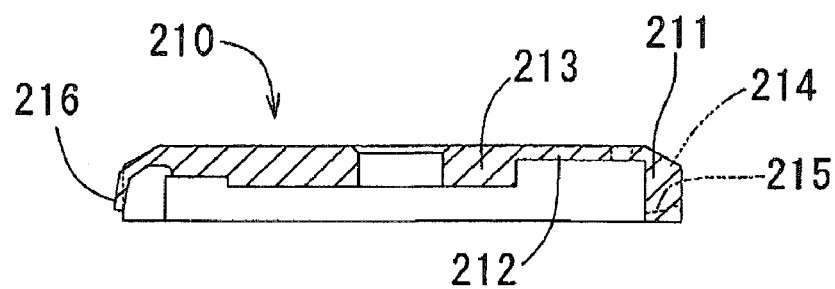
Figure 4A:
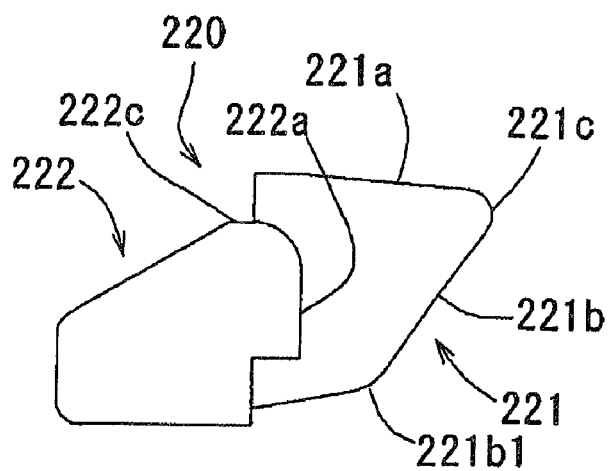
FIGS. 4A, 4B, 4C and 4D are side elevational, top plan, front elevational, and axially-cut schematic section views showing a claw member employed in the chucking device of the present invention.
Figure 4B:
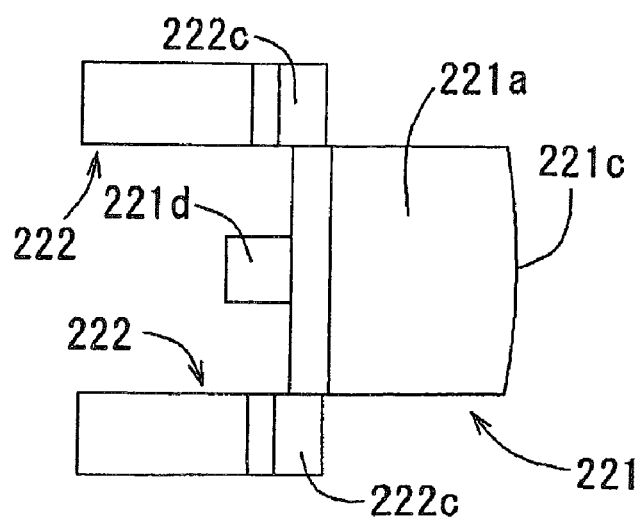
Figure 4C:
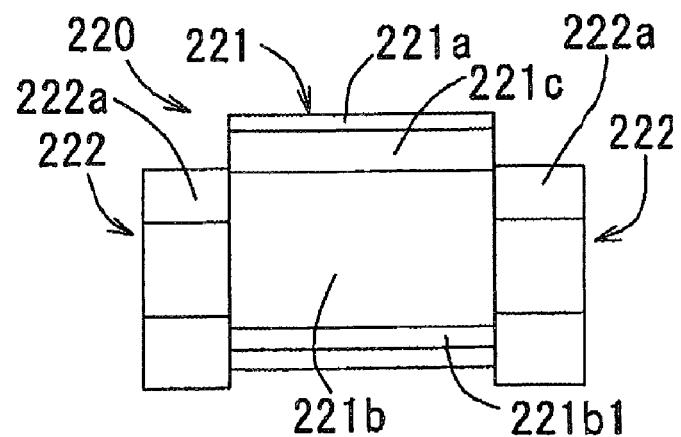
Figure 4D:
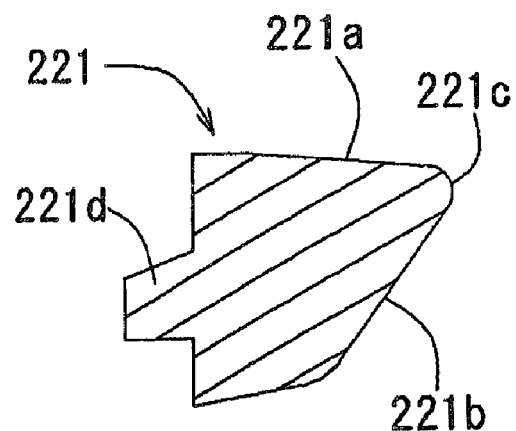
Figure 5:
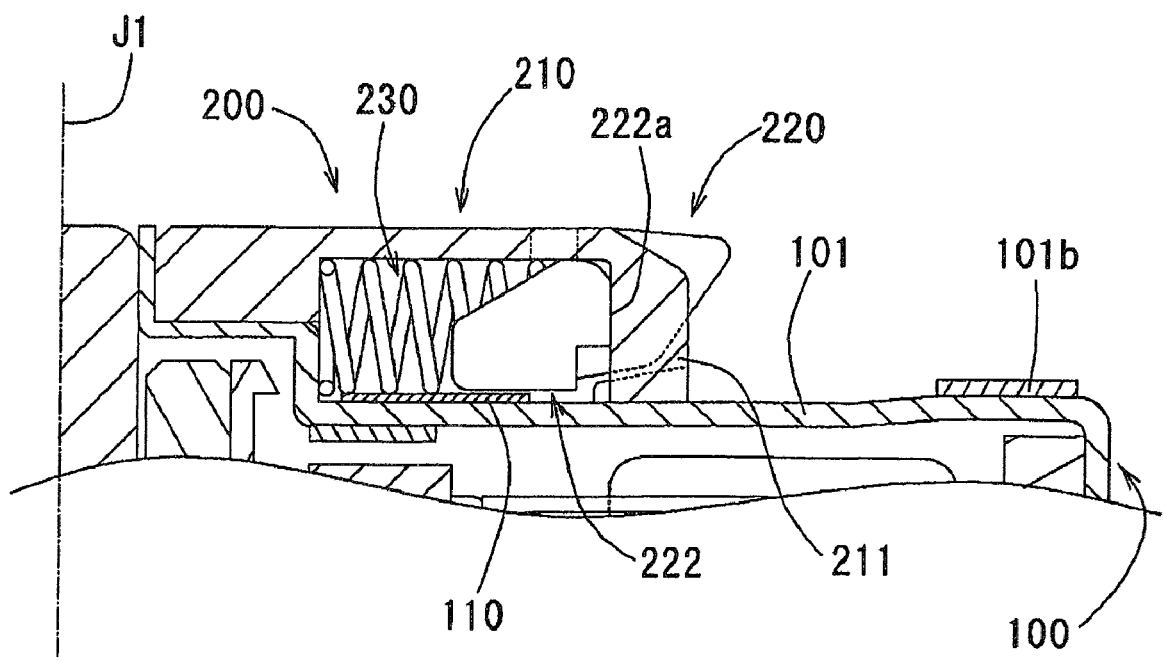
FIG. 5 is an axially-cut schematic half-section view illustrating the chucking device of the present invention kept in a standby state.

Next, the chucking device 200 of the present invention will be described with reference to FIGS. 2 to 5. FIG. 2 is a top plan view illustrating the chucking device 200 in accordance with the present invention. FIG. 3A is a top plan view showing the centering case 210 and FIG. 3B is an axially-cut schematic section view of the centering case 210. FIGS. 4A, 4B, 4C and 4D are side elevational, top plan, front elevational, and axially-cut schematic section views showing a claw member. FIG. 5 is a schematic section view illustrating the chucking device 200 in a state prior to attaching the disk KD (hereinafter referred to as a "standby state").

The chucking device 200 includes the centering case 210 having a cylinder portion 211 with a diameter slightly smaller than the inner diameter of an inner circumferential surface of the central opening KD1 of the disk KD (see FIGS. 6 to 10) and a ceiling plate portion 212 formed to continuously extend from the top end of the cylinder portion 211, a plurality of claw members 220 (three claw members in the present embodiment) movable radially with respect to the cylinder portion 211 of the centering case 210, and a plurality of resilient members 230 (three resilient members in the present embodiment) for radially outwardly biasing the respective claw members 220. The annular mounting portion 101b for mounting the disk thereon is arranged around the centering case 210. In the present embodiment, the resilient members 230 are coil springs.

The centering case 210 is formed as a single member by use of a resin material exhibiting increased slidability, such as polyacetal or polycarbonate. The centering case 210 is provided with a base portion 213 fixed to an outer circumferential surface of the shaft fixing portion 103 of the rotor holder 100. The ceiling plate portion 212 interconnects the base portion 213 and the cylinder portion 211. The base portion 213 is disposed on the top surface of the central protrusion portion 101a of the rotor holder 100. Reception holes 214 (three reception holes in the present embodiment), each of which receives a part of each of the claw members 220, are formed in the outer peripheral portion across the cylinder portion 211 and the ceiling plate portion 212. The outer circumferential surface regions of the base portion 213 corresponding to the reception holes 214 are formed into a substantially planar shape. Rest portions 215 that assist sliding movement of the claw members 220 are formed in the cylinder portion 211 at the positions circumferentially corresponding to the reception holes 214. Aligning claws 216 (three aligning claws in the present embodiment) are formed between the circumferential neighboring reception holes 214. The Aligning claws 216 serves to bring the center of the central opening KD1 of the disk KD into alignment with the center of the centering case 210 by making contact with the inner circumferential surface of central opening KD1 of the disk KD (which alignment operation will be called "alignment" hereinbelow).

In this regard, the upper surfaces of the rest portions 215 and the lower surface of the ceiling plate portion 212 making contact with the claw members 220 are subjected to a surface roughness reducing treatment such as mirror finishing or the like. This treatment helps reduce the frictional force generated by the sliding movement between the claw members 220 and the rest portions 215 and the frictional force generated by the contact between the claw members 220 and the ceiling plate portion 212. Therefore, it is possible to facilitate radial inward movement of the claw members 220 when attaching the disk KD in place. As a consequence, the force required in attaching the disk KD to the chucking device 200 can be reduced.

Each of the claw members 220 is formed as a single member by use of a resin material exhibiting increased slidability, such as polyacetal or polycarbonate. Each of the claw members 220 is provided with a claw portion 221 for making contact with the disk KD and a pair of wing portions 222 formed on the opposite sides of the claw portion 221.

The claw portion 221 has a top surface section 221a with which the disk KD makes initial contact during the attaching process thereof, a disk retaining section 221b as a surface for retaining the disk KD by making contact with the top edge of the central opening KD1 when the disk KD is attached in place, and a curved tip section 221c formed to join the top surface section 221a and the disk retaining section 221b, the curved tip section 221c forming the radial outermost section of the claw portion 221. A sliding section 221b1 that makes sliding contact with the corresponding one of the rest portions 215 of the centering case 210 is provided in the lower end portion of the disk retaining section 221b. A projection 221d engaging with the corresponding one of the resilient members 230 is formed on the inner surface of the claw portion 221. The projection 221d has an upper surface inclined axially downwardly in a radial inward direction. This prevents the projection 221d from making contact with the resilient member 230 even when the tip section 221c of the claw portion 221 is inclined axially downwardly.

In this connection, the surface of the claw portion 221 is subjected to a surface roughness reducing treatment such as mirror finishing or the like. This treatment helps reduce the frictional force generated by the contact between the top surface section 221a of the claw portion 221 and the disk KD and the frictional force generated by the sliding movement between the sliding section 221b1 and the rest portion 215. Therefore, even when the disk KD contacts with the top surface section 221a, the disk KD can smoothly move toward the tip section 221c. Furthermore, the sliding section 221b1 of the claw portion 221 is smoothly slid on the rest portion 215, thereby facilitating radial inward movement of the corresponding claw member 220. As a result, it becomes possible to reduce the force required in attaching the disk KD to the chucking device 200.

Each of the wing portions 222 has a movement restricting section 222a that, in the standby state, restricts radial outward movement of the claw member 220 by making radial contact with the inner circumferential surface of the cylinder portion 211 of the centering case 210. The wing portions 222 are formed to extend radially inwardly from the inner surface of the claw portion 221. The distance between the mutually-facing sections of the wing portions 222 interposing the claw portion 221 therebetween is set to be substantially the same as the outer diameter of the portion of the resilient member 230 that makes contact with claw portion 221. The wing portions 222 serves to restrict circumferential movement of the resilient member 230. Rotation center sections 222c are formed on the top surfaces of the wing portions 222. The rotation center sections 222c make contact with the bottom surface of the ceiling plate portion 212 of the centering case 210 and, consequently, the tip section 221c of the claw member 220 is rotated downwardly in the axial direction about the rotation center sections 222c.

In this regard, the top surfaces of the wing portions 222 are subjected to a surface roughness reducing treatment such as mirror finishing or the like. This treatment helps reduce the frictional force generated when the rotation center sections 222c make contact with the bottom surface of the ceiling plate portion 212, thereby making it possible for the claw member 220 to smoothly move radially inwardly. As a result, it is possible to reduce the force required in attaching the disk KD to the chucking device 200.

Referring to FIG. 5, when the chucking device 200 is in the standby state, the movement restricting sections 222a of the wing portions 222 of the claw portion 221 come into contact with the inner circumferential surface of the cylinder portion 211 of the centering case 210, thus deciding the radial position of the claw member 220.

A generally annular sheet-like rubber piece 110 having a reduced thickness (an axial thickness of about 0.3 mm in the present embodiment) is fixed to the top surface of the rotor holder 100 in a position where the rotor holder 100 axially faces the bottom surfaces of the wing portions 222 of the claw member 220. The rubber piece 110 is made of a rubber material, a silicon material or other materials containing the rubber material or the silicon material.

<Operation of the Claw Member when Attaching and Detaching the Disk>

Figure 6:
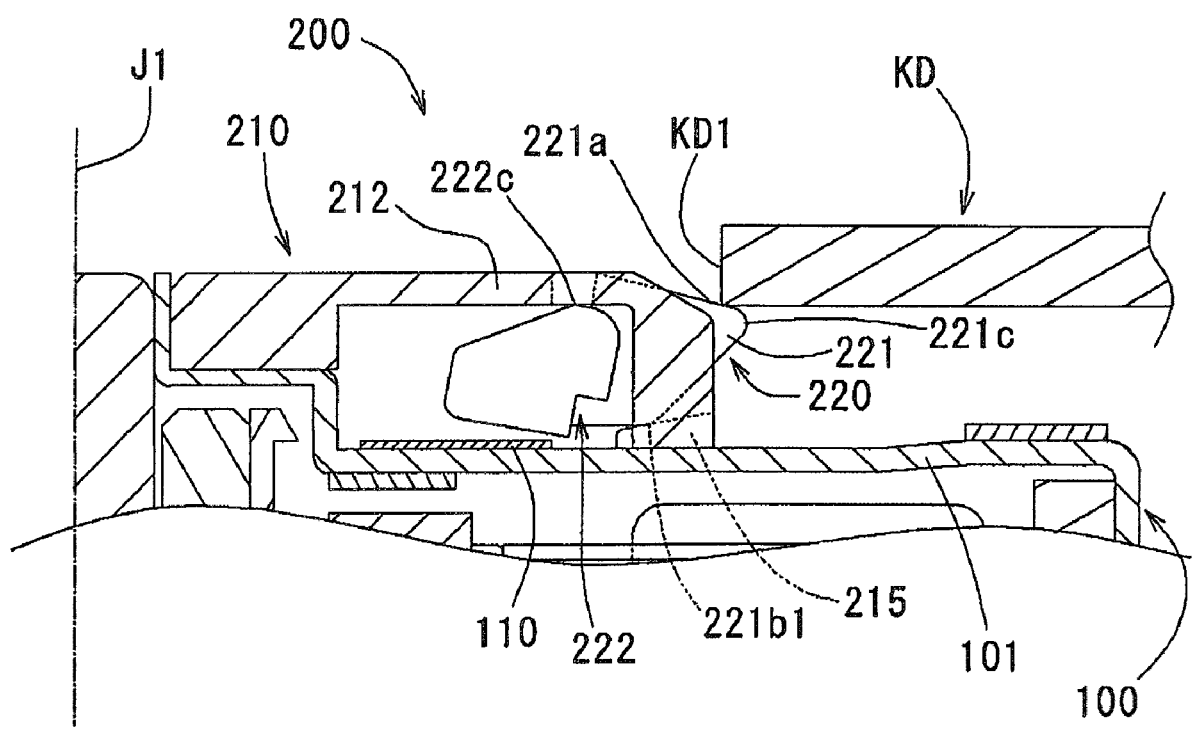
FIG. 6 is an axially-cut schematic half-section view illustrating a state that a disk is being inserted in the chucking device of the present invention.
Figure 7:
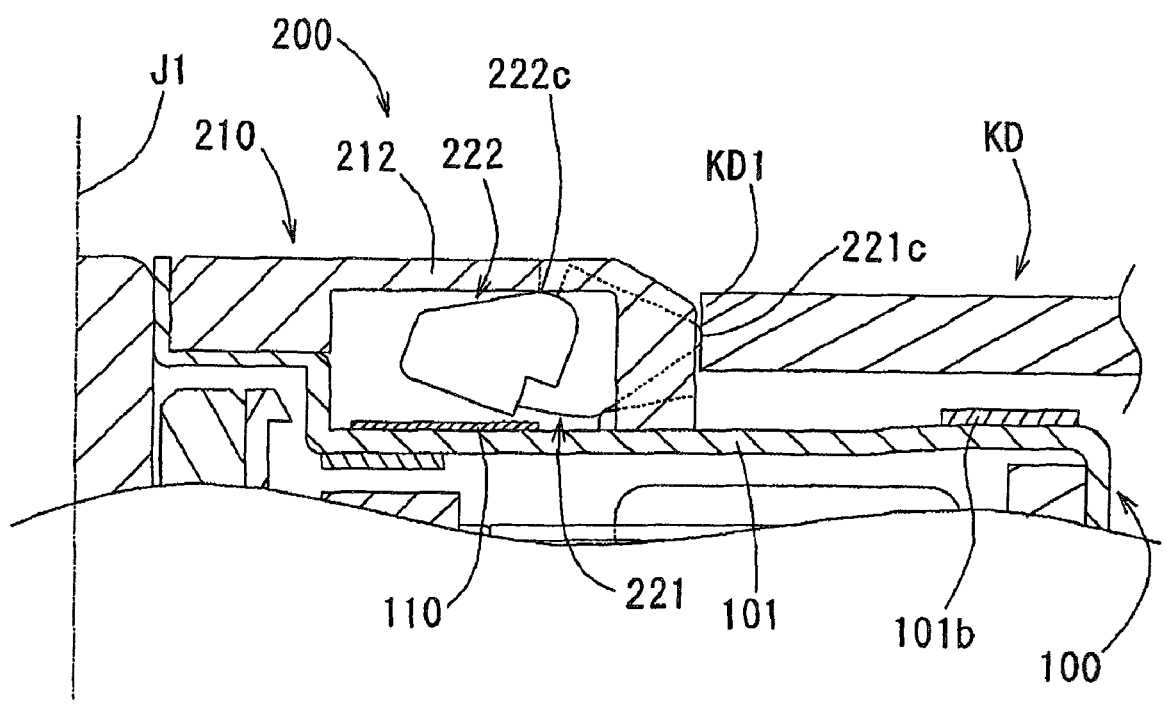
FIG. 7 is an axially-cut schematic half-section view illustrating a state that a claw member is moved radially inwardly to the greatest degree during insertion of the disk in the chucking device of the present invention.
Figure 8:
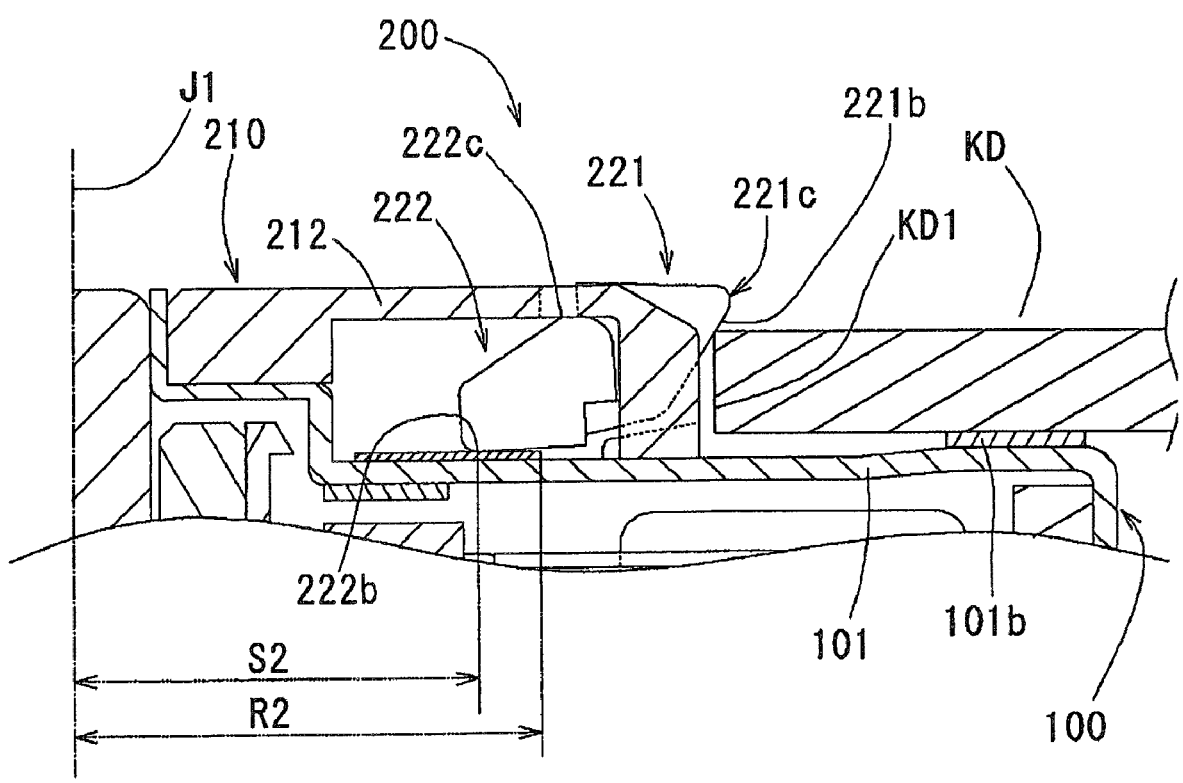
FIG. 8 is an axially-cut schematic half-section view illustrating a state that the disk is supported on a support portion in the chucking device of the present invention.
Figure 9:
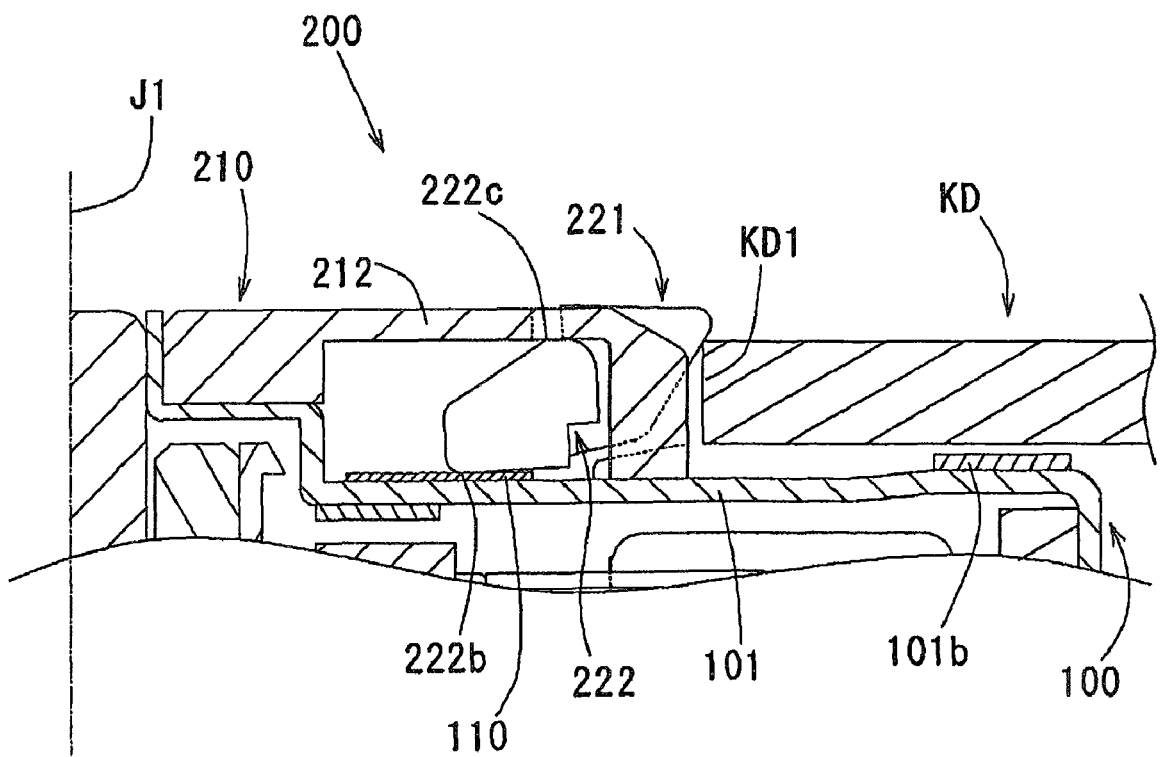
FIG. 9 is an axially-cut schematic half-section view illustrating a state that the disk is being demounted in the chucking device of the present invention.
Figure 10:
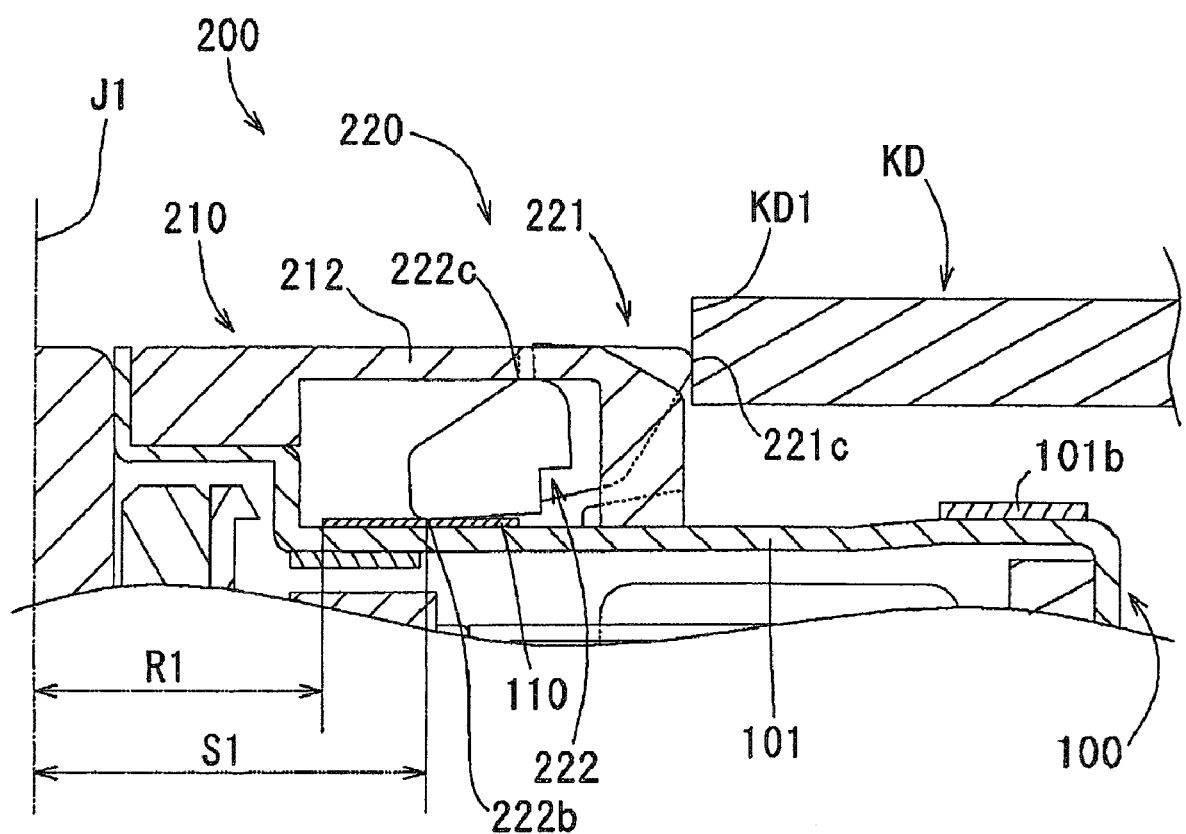
FIG. 10 is an axially-cut schematic half-section view illustrating a state that the claw member is moved radially inwardly to the greatest degree during a process of detaching the disk in the chucking device of the present invention.

Next, the operation of the claw member 220 when attaching and detaching the disk KD will be described with reference to FIGS. 6 to 10. FIG. 6 is an axially-cut schematic half-section view illustrating a state of the claw member 220 when starting to attach the disk KD in place. FIG. 7 is an axially-cut schematic half-section view illustrating a state that the claw member 220 is moved radially inwardly to the greatest degree as the attaching operation of the disk KD is in progress. FIG. 8 is an axially-cut schematic half-section view illustrating a state of the claw member 220 when the disk KD is attached in place. FIG. 9 is an axially-cut schematic half-section view illustrating a state of the claw member 220 when starting to demount the disk KD. FIG. 10 is an axially-cut schematic half-section view illustrating a state that the claw member 220 is moved radially inwardly to the greatest degree during the process of detaching the disk KD. The resilient member 230 is omitted in FIGS. 6 to 10.

When starting to attach the disk KD, the top surface section 221a of the claw member 220 comes into contact with the bottom circumferential edge of the central opening KD1 of the disk KD. By the force exerted when attaching the disk KD, the claw portion 221 of the claw member 220 is moved radially inwardly. This is because the rotation center sections 222c on the top surfaces of the wing portions 222 are brought into contact with the bottom surface of the ceiling plate portion 212 and the tip section 221c of the claw portion 221 is swung axially downwardly about the rotation center sections 222c. In this state, the sliding section 221b1 makes sliding movement relative to the rest portion 215, thereby assisting the axial downward movement of the tip section 221c of the claw portion 221 and the radial inward movement of the claw member 220. As the tip section 221c of the claw portion 221 is moved axially downwardly, the sections of the wing portions 222 lying radially inwardly from the rotation center sections 222c are caused to move axially upwardly. If the disk KD is moved downwardly in the axial direction, the claw member 220 is further moved radially inwardly whereby the inner circumferential surface of the central opening KD1 of the disk KD makes contact with the tip section 221c of the claw portion 221.

When the disk KD is mounted on the mounting portion 101b, the tip section 221c of the claw portion 221 is located above the upper surface of the disk KD. The disk retaining section 221b of the claw portion 221 is brought into contact with the top edge of the central opening KD1 of the disk KD (see FIG. 8). Thus, the disk retaining section 221b holds the disk KD in place by imparting a downwardly acting force and a radially outwardly acting force on the top edge of the central opening KD1 of the disk KD. In the state that the disk KD is held in place, the radial inward sections of the bottom surfaces of the wing portions 222 come into contact with the top surface of the rubber piece 110 (hereinafter, the sections of the wing portions 222 making contact with the rubber piece 110 will be referred to as "claw member's contact sections 222b"). The rotation center sections 222c of the claw member 220 remain in contact with the bottom surface of the ceiling plate portion 212.

When detaching the disk KD, the claw member 220 is kept in a state that the claw member's contact sections 222b make contact with the rubber piece 110 and the rotation center sections 222c remain in contact with the bottom surface of the ceiling plate portion 212, which restricts rotation of the claw member by the detaching force acting to remove the disk KD (namely, the force acting to move the disk KD substantially in the axial direction).

Further, the claw member 220 is moved radially inwardly by the detaching force of the disk KD. Therefore, the radial inward movement of the claw member 220 occurs in a state that the contact sections 222b of the claw member 220 are kept in contact with the rubber piece 110. In this regard, the rubber piece 110 is capable of hampering the radial inward movement of the claw member 220, because the frictional force generated by the contact between the claw member 220 and the rubber piece 110 is greater than the frictional force generated, in the prior art, by the direct contact between the claw member 220 and the top surface of the cover portion 101 of the rotor holder 100 in the conventional case. Therefore, when the claw member's contact sections 222b of the wing portions 222 come into contact with the rubber piece 110, the force required in radially inwardly moving the claw member 220 becomes greater than the force required in radially inwardly moving the claw member 220 in the case when the claw member's contact sections 222b make contact with the top surface of the cover portion 101 of the rotor holder 100. In other words, it is possible to increase the detaching force of the disk KD. This makes it possible to prevent the disk KD from being removed out of the chucking device 200 even when the disk KD is vibrated or moved by external impacts or vibration. Accordingly, it becomes possible to provide the chucking device with increased reliability.

It is preferred that the inner radius R1 of the rubber piece 110 is smaller than the radial distance S1 from the center axis J1 to the claw member's contact sections 222b when the claw member 220 is moved radially inwardly to the greatest degree during the detaching process. It is also preferred that the outer diameter R2 of the rubber piece 110 is greater than the radial distance S2 from the center axis J1 to the claw member's contact sections 222b when the claw member 220 is located radially outwardly to the greatest degree during the detaching process. By setting the inner and outer radii of the rubber piece 110 as above, the contact sections 222b of the claw member 220 are kept in contact with the rubber piece 110 whenever the disk KD is detached. Therefore, the radial inward movement of the claw member 220 during the process of detaching the disk KD is made in a state that the claw member's contact sections 222b remain in contact with the rubber piece 110. As a consequence, it is possible to increase the force required in moving the claw member 220 radially inwardly, thereby increasing the detaching force of the disk KD.

During the process of attaching the disk KD, the claw member 220 is moved radially inwardly in a smooth manner because the claw member's contact sections 222b do not make contact with rubber piece 110. In contrast, when the disk KD is removed (namely, during the process of detaching the disk KD), the claw member's contact sections 222b come into contact with rubber piece 110, thereby requiring a greater force in moving the claw member 220 radially inwardly. Therefore, with such a chucking device, the disk KD is easily attached but hardly removed.

OTHER EMBODIMENTS

Figure 11A:
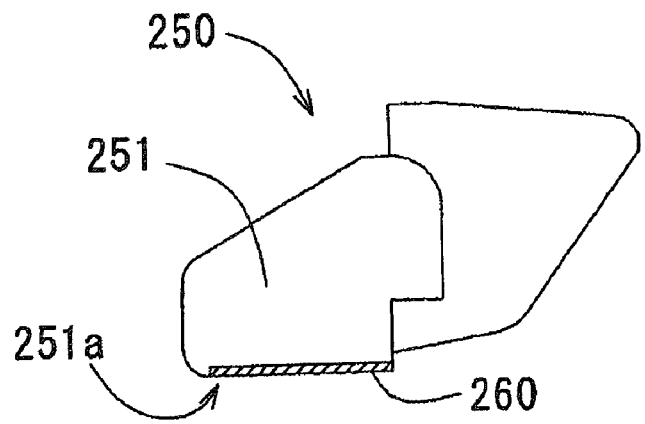
FIGS. 11A and 11B are schematic side elevational and bottom plan views showing another embodiment of the claw member of the present invention.
Figure 11B:
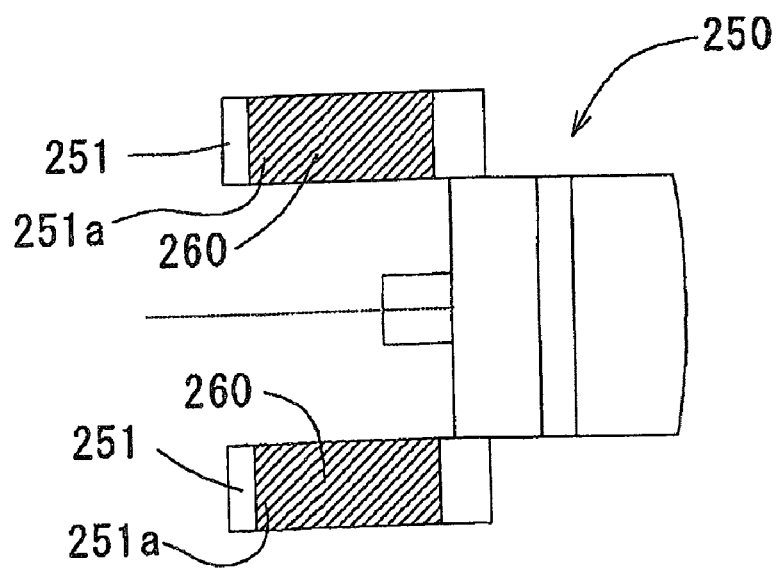
Figure 12A:
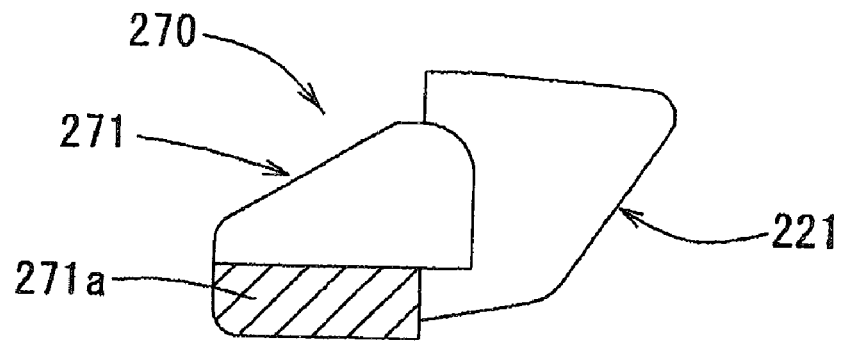
FIGS. 12A and 12B are schematic side elevational and bottom plan views showing a further embodiment of the claw member of the present invention.
Figure 12B:
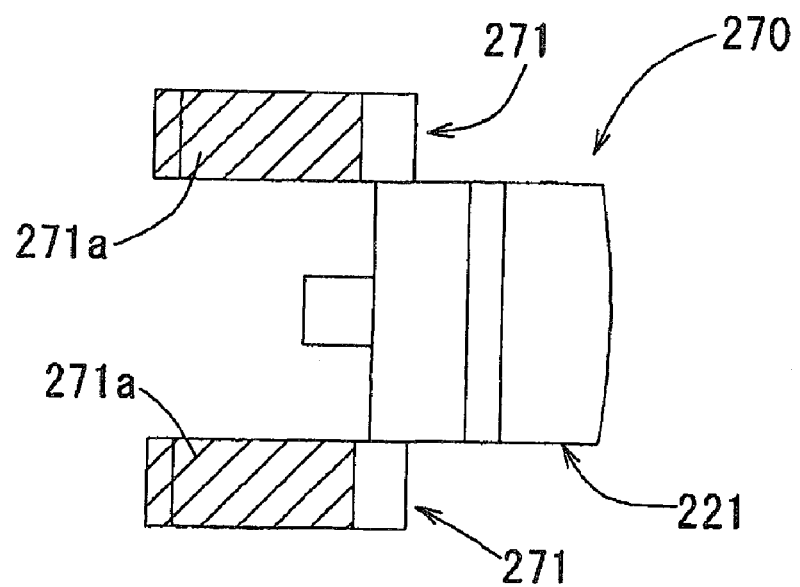
Figure 13A:
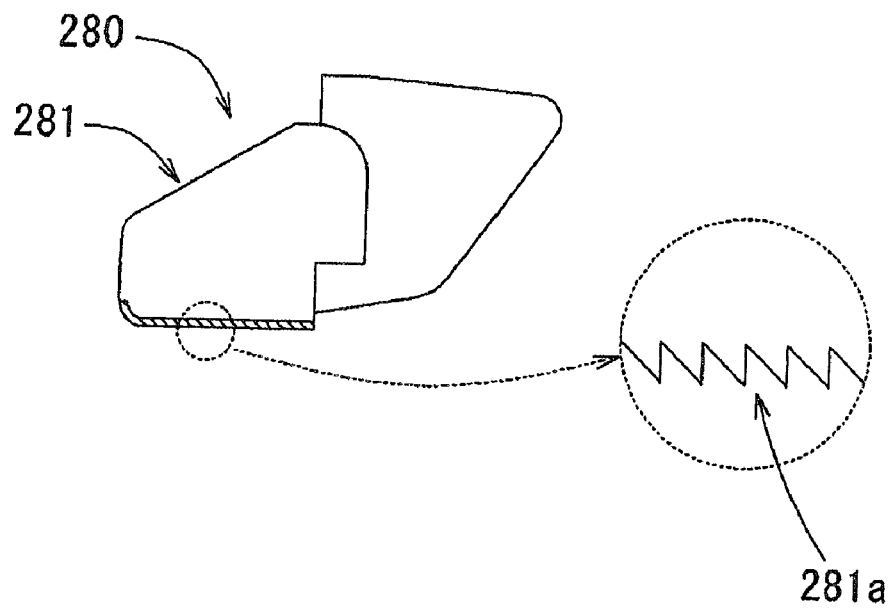
FIGS. 13A and 13B are schematic side elevational and bottom plan views showing a still further embodiment of the claw member of the present invention.
Figure 13B:
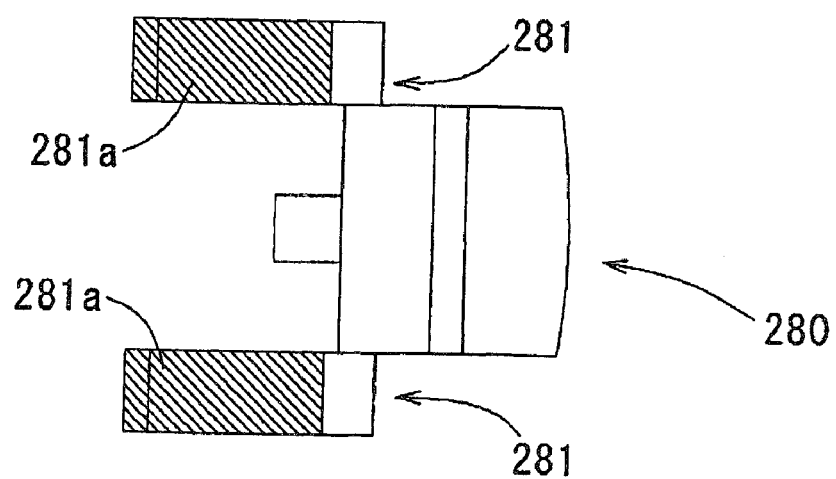

Other embodiments of the present invention having other structures that increase the detaching force of the disk KD in the chucking device will be described with reference to FIGS. 11 to 13. FIGS. 11A and 11B are schematic views showing another structure of the claw member. FIGS. 12A and 12B are schematic views showing a further structure of the claw member. FIGS. 13A and 13B are schematic views showing a still further structure of the claw member. Claw members 250, 270 and 280 shown in FIGS. 11 to 13 have substantially the same shape as that of the claw member 220 set forth earlier. Therefore, redundant descriptions in respect of the same portions or sections as those of the claw member 220 will be omitted.

Referring to FIGS. 11A and 11B, a claw member 250 is formed as a single member by use of a resin material exhibiting increased slidability, such as polycarbonate or polyacetal. The claw member 250 is provided with a pair of wing portions 251. Sheet-like rubber pieces 260 made of a rubber material, a silicon material or other materials containing the rubber material or the silicon material are fixed to the bottom surfaces of the wing portions 251 by means of, e.g., a sticky agent or an adhesive agent. Accordingly, the claw member's contact sections 251a formed on the bottom surfaces of the wing portions 251 for making contact with the top surface of the cover portion 101 of the rotor holder 100 are made of a rubber material or other materials exhibiting a static friction coefficient greater than that of other sections of the claw member 250. Therefore, it is possible to increase the detaching force of the disk KD. This makes it possible to provide a chucking device with increased reliability capable of eliminating the possibility that the disk KD is inadvertently removed from the chucking device by external impacts or vibration during rotation of the disk KD.

Referring to FIGS. 12A and 12B, a claw member 270 is formed by coinjection molding. The bottom surfaces of wing portions 271 of the claw member 270 are molded with a rubber material, a silicon material or a mixture of the rubber material and the silicon material. The top surfaces of the wing portions 271 and the claw portion 221 are molded with a resin material exhibiting increased slidability, such as polycarbonate or polyacetal. Accordingly, the claw member's contact sections 271a formed on the bottom surfaces of the wing portions 271 for making contact with the top surface of the cover portion 101 of the rotor holder 100 are made of a rubber material or other materials exhibiting a static friction coefficient greater than that of other sections of the claw member 270. Therefore, it is possible to increase the detaching force of the disk KD. This makes it possible to provide a chucking device with increased reliability capable of eliminating the possibility that the disk KD is inadvertently removed from the chucking device by external impacts or vibration during rotation of the disk KD.

Referring to FIGS. 13A and 13B, the bottom surfaces of wing portions 281 of a claw member 280 are subjected to a texturing process so that they can have increased roughness. Therefore, the bottom surfaces of the wing portions 281 generate a frictional force greater than that generated by the surfaces of the wing portions 281 making contact with the centering case 210 when the storage medium KD is attached. Since the claw member's contact sections 281a formed on the bottom surfaces of the wing portions 281 for making contact with the top surface of the cover portion 101 of the rotor holder 100 exhibit increased friction coefficient, it is possible to increase the detaching force of the storage medium KD.

The claw member's contact sections 251a, 271a and 281a illustrated in FIGS. 11 to 13 may be formed together with rubber piece 110 fixed to the top surface of the cover portion 101 of the rotor holder 100 in the aforementioned embodiment. Use of the rubber piece 110 makes it possible to further increase the detaching force of the disk KD.

<Disk Driving Apparatus>

Figure 14:
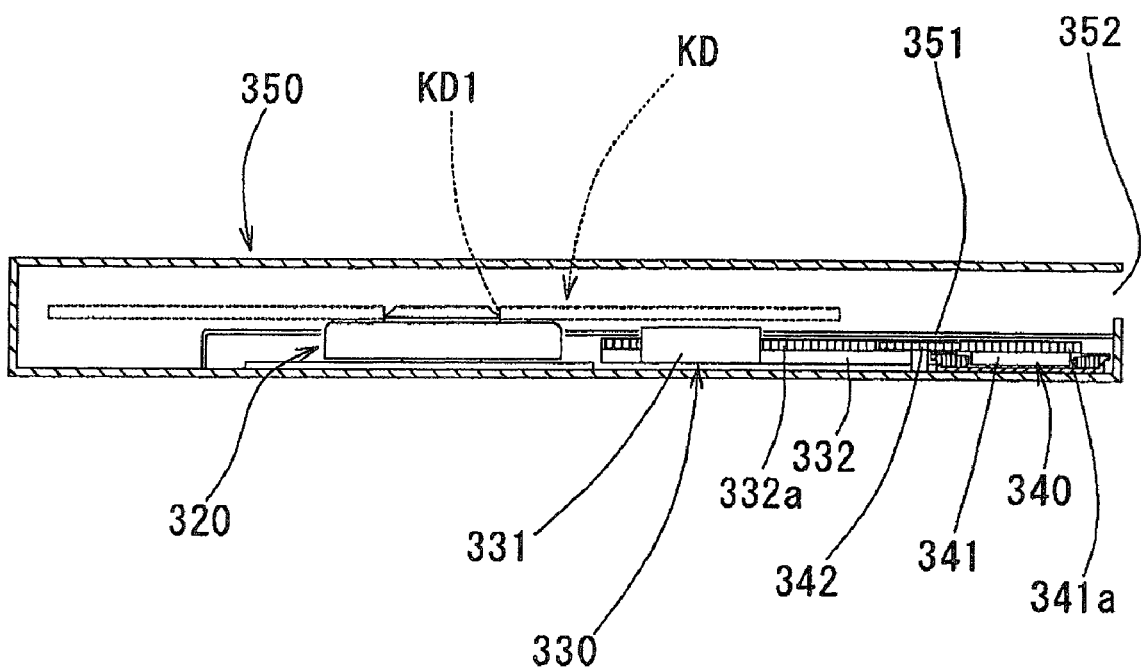
FIG. 14 is an axially-cut schematic section view showing one embodiment of a disk driving apparatus in accordance with the present invention.
Figure 15:
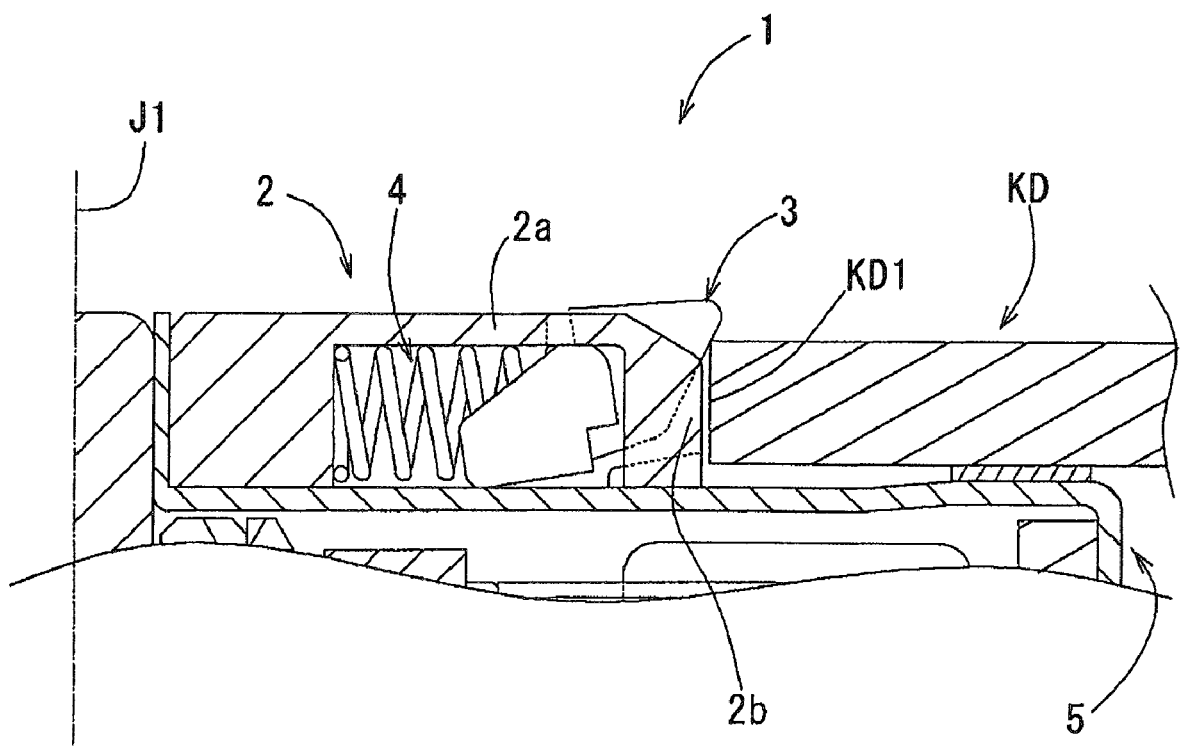
FIG. 15 is an axially-cut schematic half-section view showing a conventional chucking device.

One example of a disk driving apparatus in accordance with the present invention will be described with reference to FIG. 14 showing an axially-cut schematic section view thereof.

Referring to FIG. 14, the disk driving apparatus 300 includes a brushless motor 320 for rotating a disk KD with a central opening KD1, the motor 320 being inserted into the central opening KD1 of the disk KD to bring the center of the central opening KD1 into alignment with the rotational axis J1; a pickup mechanism 330 for recording information on the disk KD and reproducing the information stored in the disk KD by irradiating a laser beam on the disk KD; a gear mechanism 340 for moving the pickup mechanism 330 in a radial direction of the disk KD; and a case 350 for accommodating the brushless motor 320, the pickup mechanism 330 and the gear mechanism 340.

The gear mechanism 340 includes a motor 341 and a driven gear 342 for receiving a torque of the motor 341.

A partition plate 351 for isolating a moving section of the disk KD and the gear mechanism 340 is provided within the case 350. Furthermore, the case 350 has an access opening 352 through which the disk KD is introduced and taken out.

The pickup mechanism 330 includes a recording and reproducing unit 331 for irradiating a laser beam and a moving unit 332 for moving the recording and reproducing unit 331, the moving unit 332 being provided perpendicularly to the moving direction of the recording and reproducing unit 331 which coincides with the rotating direction of the disk KD. The moving unit 332 has a meshing portion 332a that comes into meshing engagement with the driven gear 342. The recording and reproducing unit 331 is meshed with the moving unit 332 and consequently moved in the radial direction.

The driven gear 342 is rotated by coming into meshing engagement with a gear portion 341a attached to the motor 341. The moving unit 332 is moved in the radial direction because the driven gear 342 remains meshed with the meshing portion 332a of the moving unit 332. Upon movement of the moving unit 332, the recording and reproducing unit 331 is moved in the radial direction.

Use of the motor of the present invention as the brushless motor 320 of the disk driving apparatus 300 makes it possible to prevent the disk KD from being inadvertently removed out of the brushless motor 320 even when external impacts or vibration are applied to the disk driving apparatus 300. Accordingly, it becomes possible to provide a disk driving apparatus with increased reliability.

While certain embodiments of the present invention have been described hereinabove, the present invention is not limited to these embodiments. Many changes or modifications may be made without departing from the scope of the claims.

As an example, although the force required in moving the claw member 220 radially inwardly is increased by fixing the rubber piece 110 to the top surface of the cover portion 101 of the rotor holder 100 in the embodiments disclosed herein, the present invention is not limited thereto. For instance, the force required in moving the claw member 220 radially inwardly may be increased by forming axial through-holes in the circumferential positions of the cover portion 101 of the rotor holder 100 corresponding to the claw members 220 and filling the through-holes with a material, such as a rubber material or a silicon material, having a friction coefficient greater than that of the remaining portions of the rotor holder 100.

As another example, although the rubber piece 110 is formed into a generally annular shape in the embodiments disclosed herein, the present invention is not limited thereto. The rubber piece 110 may be formed at least in a position corresponding to each of the claw member side contact sections 222b.

As a further example, although the claw member's contact sections 222b make linear contact with the rubber piece 110 in the embodiments disclosed herein, the present invention is not limited thereto. For instance, the contact between the claw member's contact sections 222b and the rubber piece 110 may be point-to-point contact or surface-to-surface contact. In case of using the surface-to-surface contact, the friction force is further increased, thereby making it possible to increase the detaching force of the disk KD.

As a still further example, although the claw member's contact sections 222b make contact with the rubber piece 110 when the disk KD is placed on the support portion 101b in the embodiments disclosed herein, the present invention is not limited thereto. The claw member's contact sections 222b may be allowed to make contact with the rubber piece 110 at least when detaching the disk KD.

While the invention has been shown and described with respect to the embodiments, it will be understood by those skilled in the art that various changes and modification may be made without departing from the scope of the invention as defined in the following claims.

What is claimed is:

1. A motor comprising:
a chucking device for detachably holding a disk-shaped storage medium having a central opening;
a rotating member including a rotor magnet rotatable about a specified center axis and a turntable having a mounting portion for mounting the storage medium; and
a fixed member for supporting the rotating member, the fixed member having a stator disposed in a facing relationship with the rotor magnet, the stator adapted to produce a rotating magnetic field in cooperation with the rotor magnet,
wherein the turntable has a cover portion for covering an axial upper side of the stator and the chucking device is arranged on an axial top surface of the cover portion,
wherein the chucking device comprises: a plurality of radially outwardly biased claw members having radial outermost tip sections; a centering case having reception holes for allowing the claw members to move radially and rest portions provided in the respective reception holes, the rest portions making sliding contact with the respective claw members when the tip sections of the claw members are moved axially downwardly, the reception holes being disposed radially inwardly of the central opening of the storage medium when the storage medium is mounted on the mounting portion; and resilient members received within the centering case for radially outwardly biasing the respective claw members by making contact therewith,
wherein the tip sections of the claw members move axially downwardly and radially inwardly when the central opening of the storage medium is fitted around the centering case and the claw members make contact with a top edge of the central opening of the storage medium when the storage medium is mounted on the mounting portion,
wherein the claw members make contact with a top surface of the cover portion of the turntable when the claw members are in contact with the top edge of the central opening of the storage medium,
wherein the claw members are provided with contact sections for making contact with the top surface of the cover portion of the turntable and the turntable is provided with a contact section for making contact with the claw members, and
wherein at least one of the claw member's contact sections and the turntable's contact section has surface roughness greater than the surface roughness of the rest portions and the portions of the claw members making contact with the rest portions.

2. The motor of claim 1, wherein the claw member's contact sections are subjected to a texturing process.

3. The motor of claim 1, wherein at least one of the rest portions and the portions of the claw members making sliding contact with the rest portions is formed to have surface roughness smaller than the surface roughness of the remaining portions of the centering case and the remaining portions of the claw members.

4. A disk driving apparatus comprising:
the motor recited in claim 1;
an optical pickup performing at least one of recording information on and reproducing information from the storage medium in an optical manner; and
a moving mechanism for moving the optical pickup device in a radial direction of the storage medium.

5. A motor comprising:
a chucking device for detachably holding a disk-shaped storage medium having a central opening;
a rotating member including a rotor magnet rotatable about a specified center axis and a turntable having a mounting portion for mounting the storage medium; and
a fixed member for supporting the rotating member, the fixed member having a stator disposed in a facing relationship with the rotor magnet, the stator adapted to produce a rotating magnetic field in cooperation with the rotor magnet,
wherein the turntable has a cover portion for covering an axial upper side of the stator and the chucking device is arranged on an axial top surface of the cover portion,
wherein the chucking device comprises: a plurality of radially outwardly biased claw members having radial outermost tip sections; a centering case having reception holes for allowing the claw members to move radially and rest portions provided in the respective reception holes, the rest portions making sliding contact with the respective claw members when the tip sections of the claw members are moved axially downwardly, the reception holes being disposed radially inwardly of the central opening of the storage medium when the storage medium is mounted on the mounting portion; and resilient members received within the centering case for radially outwardly biasing the respective claw members by making contact therewith,
wherein the tip sections of the claw members move axially downwardly and radially inwardly when the central opening of the storage medium is fitted around the centering case and the claw members make contact with a top edge of the central opening of the storage medium when the storage medium is mounted on the mounting portion,
wherein the claw members make contact with a top surface of the cover portion of the turntable when the claw members are in contact with the top edge of the central opening of the storage medium,
wherein the claw members are provided with contact sections for making contact with the top surface of the cover portion of the turntable and the turntable is provided with a contact section for making contact with the claw members, and
wherein at least one of the claw member's contact sections and the turntable's contact section is made of a material different than a material forming the remaining sections of the claw members and the remaining section of the turntable so that the static friction coefficient between the claw member's contact sections and the turntable's contact section becomes greater than the static friction coefficient between the claw members and the rest portions.

6. The motor of claim 5, wherein the turntable's contact section is formed by fixing a rubber material, a silicon material or a material containing the rubber material and the silicon material to the top surface of the cover portion of the turntable.

7. The motor of claim 6, wherein the rubber material, the silicon material or the material containing the rubber material and the silicon material is formed into an annular sheet shape.

8. The motor of claim 6, wherein the rubber material, the silicon material or the material containing the rubber material and the silicon material is extended to a position located radially inwardly of the claw member's contact sections when the claw members are moved radially inwardly to the greatest degree.

9. The motor of claim 5, wherein a rubber material, a silicon material or a material containing the rubber material and the silicon material is fixed to each of the contact sections of the claw members.

10. The motor of claim 5, wherein the claw members are molded by coinjection molding and the claw member's contact sections are molded with a rubber material, a silicon material or a mixture of the rubber material and the silicon material.

11. The motor of claim 5, wherein at least one of the rest portions and the portions of the claw members making sliding contact with the rest portions is formed to have surface roughness smaller than the surface roughness of the remaining portions of the centering case and the remaining portions of the claw members.

12. A disk driving apparatus comprising:
the motor recited in claim 5;
an optical pickup performing at least one of recording information on and reproducing information from the storage medium in an optical manner; and
a moving mechanism for moving the optical pickup device in a radial direction of the storage medium.

13. A disk driving apparatus comprising:
the motor recited in claim 11;
an optical pickup performing at least one of recording information on and reproducing information from the storage medium in an optical manner; and
a moving mechanism for moving the optical pickup device in a radial direction of the storage medium.

14. A motor comprising:
a chucking device for detachably holding a disk-shaped storage medium having a central opening;
a rotating member including a rotor magnet rotatable about a specified center axis and a turntable having a mounting portion for mounting the storage medium; and
a fixed member for supporting the rotating member, the fixed member having a stator disposed in a facing relationship with the rotor magnet, the stator adapted to produce a rotating magnetic field in cooperation with the rotor magnet,
wherein the turntable has a cover portion for covering an axial upper side of the stator and the chucking device is arranged on an axial top surface of the cover portion,
wherein the chucking device comprises: a plurality of radially outwardly biased claw members having radial outermost tip sections; a centering case having reception holes for allowing the claw members to move radially and rest portions provided in the respective reception holes, the rest portions making sliding contact with the respective claw members when the tip sections of the claw members are moved axially downwardly, the reception holes being disposed radially inwardly of the central opening of the storage medium when the storage medium is mounted on the mounting portion; and resilient members received within the centering case for radially outwardly biasing the respective claw members by making contact therewith, wherein the tip sections of the claw members move axially downwardly and radially inwardly when the central opening of the storage medium is fitted around the centering case and the claw members make contact with a top edge of the central opening of the storage medium when the storage medium is mounted on the mounting portion, wherein the claw members make contact with a top surface of the cover portion of the turntable when the claw members are in contact with the top edge of the central opening of the storage medium, wherein the claw members are provided with contact sections for making contact with the top surface of the cover portion of the turntable, and wherein the friction coefficient between the claw member's contact sections and the cover portion is set greater than the friction coefficient between the claw members and the rest portions.

* * * * *